No. 768,330. PATENTED AUG. 23, 1904.
C. P. JONES.
SHIP'S COURSE INDICATOR.
APPLICATION FILED APR. 18, 1903.
NO MODEL.

Attest:
C. A. Middleton
Edw. L. Reed

Inventor
Charles P. Jones.
by Ellis Spear & Company
Attys.

No. 768,330.

Patented August 23, 1904.

UNITED STATES PATENT OFFICE.

CHARLES PRYCE JONES, OF BIRKENHEAD, ENGLAND.

SHIP'S-COURSE INDICATOR.

SPECIFICATION forming part of Letters Patent No. 768,330, dated August 23, 1904.

Application filed April 18, 1903. Serial No. 153,278. (No model.)

*To all whom it may concern:*

Be it known that I, CHARLES PRYCE JONES, a citizen of the United States of America, residing in Oxton, Birkenhead, in the county of Chester, England, have invented a certain new and useful Improved Ship's-Course Indicator, of which the following is a specification.

This invention relates to an improved instrument for determining the compass course of a ship from the true course as indicated on the chart or for determining the true course from the compass course; and the object is to provide an instrument which when laid on the chart shall enable the navigator to determine in a purely automatic or mechanical manner the proper compass course to steer, the necessary correction for compass error being made in the instrument itself, the use of which also dispenses with the necessity for using parallel rulers, protractors, and the like. The instrument can also be used for the reverse process—viz., the determination of the true course from the compass course.

I have illustrated my invention in the accompanying drawings, in which—

Figure 1:
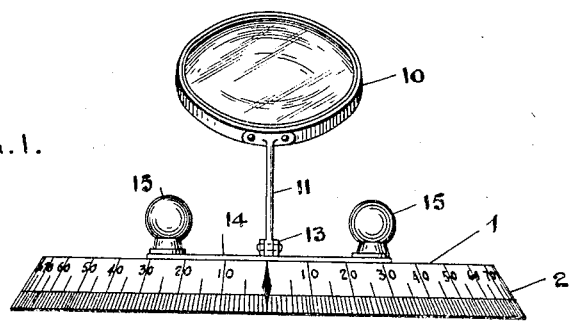
Figure 2:
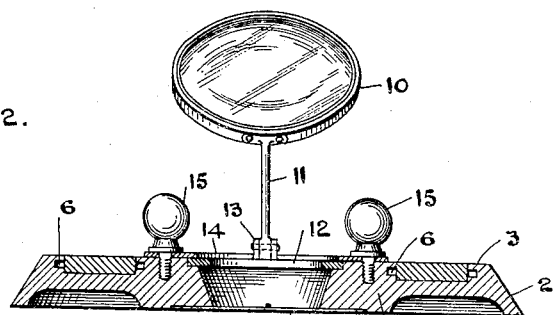
Figure 3:
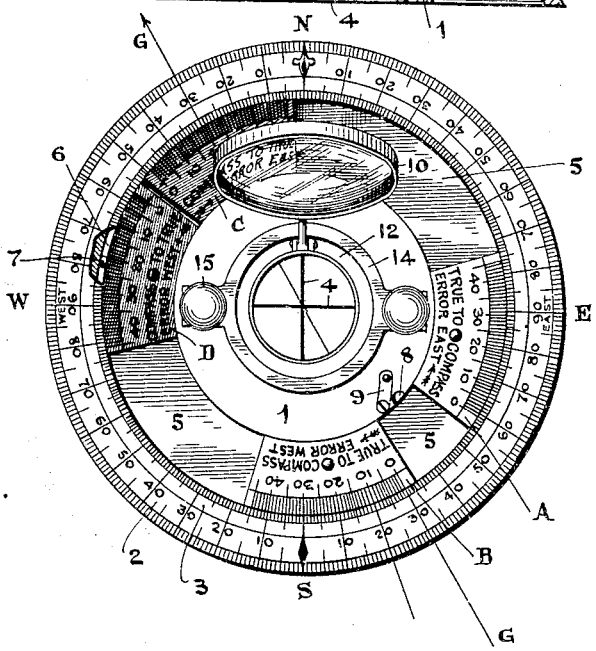
Figure 4:
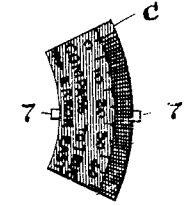

Figure 1 is an elevation of the instrument; Fig. 2, an elevation in medial section; Fig. 3, a plan; Fig. 4, a detail view showing one of the segments.

The instrument, as illustrated in the drawings, comprises a ring 1 with a beveled external edge 2, on which, as well as on the face 3, the four cardinal points of the compass are marked, the right angles in between being graduated in degrees. Across the open center of the ring are a pair of cross-wires 4, intersecting at right angles at the center. The body of the ring has an annular recess 5, in which four segments A, B, C, and D, also graduated in degrees, are adapted to fit, and in which they may be rotated about the center of the ring. One pair of segments, A and B, are marked "True course to compass course," and one of the pair, A, is used and marked for an easterly correction and one, B, for a westerly correction. The other pair, C and D, are marked "Compass course to true course," and the respective segments for this pair C and D are marked and used for easterly and westerly corrections. The annular recess 5 has an annular groove 6 formed in each side, and the segments are each provided with a pair of tongue-pieces 7, which fit in the grooves and keep the quadrants in position. The segments are inserted in position by first inserting the outer tongue-piece in the outer groove and bringing the inner tongue-piece over the notch 8, which is afterward covered by the pivoted arm 9. In order to more clearly read the graduations, a magnifying-lens 10, carried by an arm 11, hinged to the circular piece 12 by the hinge 13, is used. To permit the rotation of the lens, the circular piece 12 is carried in a central annular groove and is held in place by the cover-piece 14, secured to the ring 1 by the screwed knobs 15, which conveniently serve as handles to manipulate the instrument. These segments may be distinguished, in addition to their marking, by being colored in a distinctive manner.

The instrument is used as follows: Assuming the course is indicated on the chart by a line G G, the instrument is placed so that the cross-lines intersect on this line and so that the respective cardinal points N. and S. or E. and W. are coincident, respectively, with meridians of longitude or parallels of latitude as marked on the chart. The angle—thirty degrees in the case illustrated—the course-line makes with the N. S. line may then be read off the beveled and graduated edge. This angle would give the course to be steered if there were no compass error—viz., S. 30° E.—but in order to take this latter error into account one of the segments referred to is used. Assume that the compass error was known to be 10° W., then the segment marked "True course to compass course—error west" would be inserted in the annular groove with its zero-point opposite the line of the course, and the correct compass course to steer would then be read off the beveled edge just opposite the graduation 10° on the segment—viz., S. 20° E. If the error had been, say, 7° E., then the other segment of this pair would have been employed, its zero brought opposite the course-line, and the correct compass course read off opposite the graduation 7°—viz., S. 37° E. To change compass course into true course, the other pair of segments, either E. or W., as the case may be, would be employed.

The segments are graduated, as shown in the drawings—that is to say, in the pair marked "True course to compass course" the graduations are figured in A for an easterly compass error from the zero-point in a "counter-clockwise" direction and in B for a westerly error from the zero-point in a "clockwise" direction. In the pair C and D, marked "Compass course to true course," the marking is of course in the reverse direction from zero, respectively, to that described.

It will be seen that the operation is a purely mechanical one and there is no difficulty in selecting the right segment, as they are plainly marked.

By the use of the instrument the confusion in the mind as to whether easterly or westerly compass errors have to be respectively added to or subtracted from westerly or easterly courses is entirely obviated.

I have described the four segments as being quite separate and as being guided by the grooves. They may, however, be guided in any suitable manner—say, by means of a central pivot—and two of the segments may be combined in one, though I prefer, in order to make the operation a purely mechanical one, to use the four, as described.

Having now fully described my invention, what I claim, and desire to secure by Letters Patent, is—

1. In a course-indicator, in combination, a graduated circle on which the four cardinal points are marked, and having an open central portion in which the center of the circle is marked; and graduated segments oppositely figured as described and adapted to move concentrically round the circle with the graduations thereof in juxtaposition to the graduations of the circle; substantially as described.

2. In a course-indicator, in combination, a graduated circle on which the four cardinal points are marked, and having an open central portion across which a pair of wires are fixed, intersecting at right angles at the center, the said circle having a concentric recess formed in the face thereof; and graduated segments oppositely figured as described, adapted to fit the said recess and to move concentrically round the circle with their graduations in juxtaposition to the graduations of the circle; substantially as described.

3. In a course-indicator, in combination, a circle with an open central part and having a beveled edge and a concentrically-recessed face, the beveled edge and the portion of the face outside the recess being graduated and marked with the four cardinal points; a pair of wires intersecting at right angles at the center; and graduated segments oppositely figured as described, and adapted to fit the recess and to move concentrically round the circle with their graduations in juxtaposition to the graduations of the circle; substantially as described.

4. In a course-indicator, in combination with the graduated circle, two pairs of segments movable independently of each other, one pair being distinguished from the other, and one segment of each pair having its graduations figured from zero in clockwise direction, and the other segment of each pair having its graduations figured from zero in a counter-clockwise direction; substantially as described.

5. In a course-indicator, in combination with the graduated circle; two pairs of segments, one pair, distinguished from the other, being marked "True to compass," one segment of this pair having its graduations marked from zero counter-clockwise and being marked "Error east," and the other segment having its graduations oppositely figured and being marked "Error west" the other pair being each marked "Compass to true," one segment having its graduations figured from zero counter-clockwise and being marked "Error west" and the other having its graduations oppositely figured and being marked "Error east;" substantially as described.

6. In a course-indicator, in combination, a graduated circle having an annular recess with grooved sides one of which is notched and provided with a cover and segments having tongue-pieces adapted to fit the grooves and to keep the segments in position; substantially as described.

7. In a course-indicator, in combination, the graduated circle, the segments movable independently of each other and of the graduated circle, and the magnifying-lens mounted by means of a hinged stem on a circular piece rotatively attached to the graduated circle; substantially as described.

In testimony whereof I have hereunto set my hand in the presence of two subscribing witnesses.

CHARLES PRYCE JONES.

Witnesses:
J. E. LLOYD BARNES,
JOSEPH E. HIRST.